Nov. 13, 1962

J. P. RAY

METHOD AND APPARATUS FOR RECORDING DIGITAL COUNTER VALUES 3,063,631

Filed Oct. 19, 1959

4 Sheets-Sheet 1

INVENTOR

Jon Philip Ray

BY

Stevens, Davis, Miller & Mosher

ATTORNEYS

INVENTOR
Jon Philip Ray

BY Stevens, Davis, Miller & Mosher
ATTORNEYS

Nov. 13, 1962 J. P. RAY 3,063,631

METHOD AND APPARATUS FOR RECORDING DIGITAL COUNTER VALUES

Filed Oct. 19, 1959 4 Sheets-Sheet 3

INVENTOR

Jon Philip Ray

BY

Stevens, Davis, Miller & Mosher

ATTORNEYS

INVENTOR
Jon Philip Ray
BY
Stevens, Davis, Miller & Mosher
ATTORNEYS

United States Patent Office 3,063,631
Patented Nov. 13, 1962

3,063,631

METHOD AND APPARATUS FOR RECORDING DIGITAL COUNTER VALUES

Jon Philip Ray, Dallas, Tex., assignor to Texas Instruments Incorporated, Dallas, Tex., a corporation of Delaware Filed Oct. 19, 1959, Ser. No. 847,169
6 Claims. (Cl. 235—92)

This invention relates to digital electronic circuitry, and more particularly relates to circuitry which enables a printer to record values presented by a digital counter without interfering with the operation of the counter.

Numerous digital counting and timing devices have been developed to perform such functions as measuring the frequency stability of oscillators or signal generators, measuring pulse lengths or repetition rates, and conducting various high speed measurements involving time delay. These counting devices are usually provided with displays which present the instantaneous value of the number contained in the counter so that it is easily readable by the person using the counter. However, certain problems arise when it is desired to record the contents of the counter at arbitrary times with respect to the moments when the number in the counter is changing. The signals in the counter very often vary at a high rate, e.g. 1 kc., and a printer is unable to read signals which change at such a rapid rate. Therefore, when it was desired to record values presented by a digital counter, the counter had to be stopped, and the printer would then print the number appearing at the output of the counter. After the contents of the counter had been recorded, the counter was once again started and would then proceed with its counting function. This interruption in counter operation is undesirable because the printer should be able to read the contents of the counter without stopping the count. In fact, the procedure becomes especially cumbersome when printed recordings must be made frequently, since the counter must be stopped every time a recording is made, and much time is wasted.

It is, therefore, a principal object of the present invention to provide apparatus for enabling a digital printer to record the values presented by a digital counter without interrupting the operation of the counter.

It is a further object of the invention to provide apparatus for accurately reading values contained in a digital counter at arbitrary times with respect to the times the count changes without interfering in any way with the operation of the counter and without introducing any errors in either the count read or in the new count, in the event the count is changing during the reading operation.

It is a still further object of the present invention to provide apparatus for recording values presented by a digital counter which is simple in design, and reliable and efficient in operation.

It is a still further object of the present invention to provide a novel and yet simple method for recording the contents of a digital counter while the counter is operating so as to be able to record a set of counter values more rapidly and more accurately than as has been possible under previous methods.

According to the invention, an auxiliary storage register is employed to follow the counter and to present in binary form the instantaneous values of the count. When it is desired to print the contents of the counter without disrupting the counting operation, a trigger pulse is amplified, shaped, and then stored in a gate control flip-flop. The output from the gate control flip-flop and an output from the first stage of the auxiliary storage register are fed to an AND gate. The coincidence of the two output signals at the AND gate sends a triggering signal to a clamp control flip-flop which controls a clamp circuit. The clamp circuit clamps the auxiliary storage register so that the contents of the register will no longer change in accordance with the contents of the counter, and at the same time, the clamp circuit sends a command pulse to the printer causing it to print whatever information is presently contained in the auxiliary storage register. While this is going on the contents in the counter continues to change and are unaffected by the printing operation. When the printing is finished, the gate control and clamp control flip-flops are reset, which releases the clamp on the auxiliary storage register and allows the register to once again follow the counter.

Other and further objects, advantages and characteristic features of the present invention will become readily apparent from the following detailed description of a preferred embodiment of the invention when taken in conjunction with the appended drawings in which.

Figure 1:
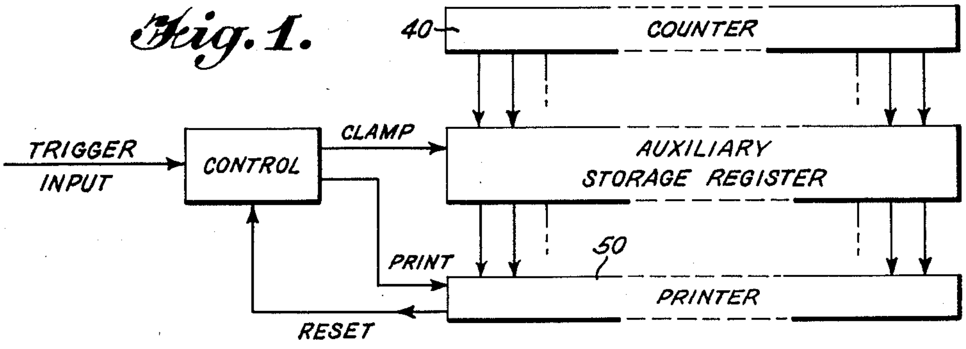
FIGURE 1 is a simplified block diagram of the apparatus of the present invention which is used in explaining its basic principles of operation.

Referring now to the drawings, and especially to FIGURE 1, an auxiliary storage register is shown connected to receive the output of a digital counter 40, the output of the auxiliary storage register being connected to a printer 50. In a preferred embodiment of the invention, the auxiliary storage register consists of 24 vacuum tube Schmitt trigger stages, each capable of storing one bit of binary information. A conventional 1–2–2–4 binary coded decimal is used; hence the storage register is capable of storing decimal numbers as large as $10^6$. It should be understood, however, that a storage register of other capacity or one which uses other storage media or binary codes could be used without departing from the principles of the invention.

During normal operation, the contents of the counter are continuously being read into the auxiliary storage register stages. When it is desired to print the contents of the counter without disrupting the counting operation, a trigger pulse is sent to the block labeled Control in FIGURE 1, and which is shown in more detailed form in FIGURES 2 and 3. A clamp signal is sent to the auxiliary storage register to hold the contents of the register at its present value while allowing the counter to proceed with its counting. At the same time, a command signal is sent to the printer to print the present contents of the auxiliary storage register. When the printing operation has been completed, a reset signal is sent to the Control, and the clamp on the auxiliary storage register is released so that the contents of the counter are again read into the auxiliary storage register.

The operation of the Control block in FIGURE 1 will now be discussed in more detailed form with specific reference to FIGURE 2. A trigger input, which is a signal to initiate the over-all clamping and printing operation is applied to a trigger amplifier 70 and pulse shaper 80 to provide pulses of the desired sharpness and amplitude. The input trigger pulses may be either positive or negative, as the trigger amplifier provides an output pulse of negative polarity regardless of the polarity of the input pulse. Output pulses from the pulse shaper 80 are fed to the On input of a gate control flip-flop 90. When the gate control flip-flop is On it will present a signal to one input of the AND gate 100. The other input to the AND gate 100 is received from the output of the first, or the least significant, stage 20 of the auxiliary storage register. The coincidence of the input signals at the AND gate will result in an output signal being applied to the On input of a clamp flip-flop 110, which in turn, controls a clamp circuit 120. Whenever the clamp circuit is activated, it clamps the contents of the auxiliary storage register at its present value regardless of whether the contents of the counter are changing. In addition, the clamp circuit 120 sends a command pulse to the printer to print whatever information is contained in the stages of the auxiliary storage register.

After the printing cycle, which in the preferred embodiment given herein lasts for approximately 250 milliseconds, an automatic reset pulse is sent to a reset circuit 140 which resets the clamp control flip-flop 110 and the gate control flip-flop 90. This allows the clamp circuit 120 to release its clamp on the auxiliary storage register, and its stages will again be fed with the present contents of the counter. When the apparatus is first turned on, the clamp control flip-flop 110 and the gate control flip-flop 90 may be in either of their two stable states. Hence a manual reset is provided so that the flip-flops 90 and 110 may be placed in the Off state before a print cycle is initiated.

Figure 3A:
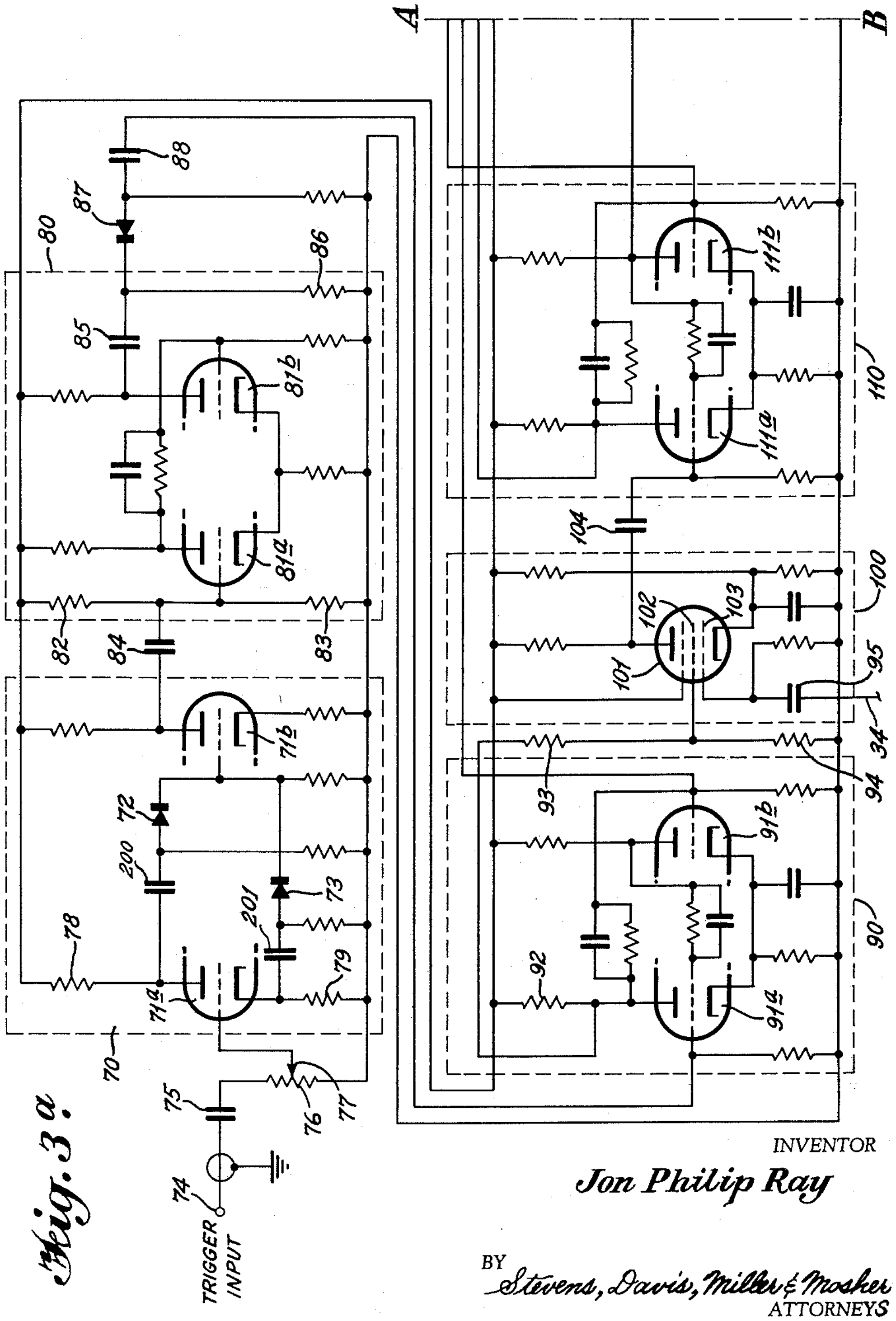
FIGURE 3*a*, *b* and *c* is a schematic circuit diagram of the apparatus shown in block diagram form in FIGURE 2.
Figure 3B:
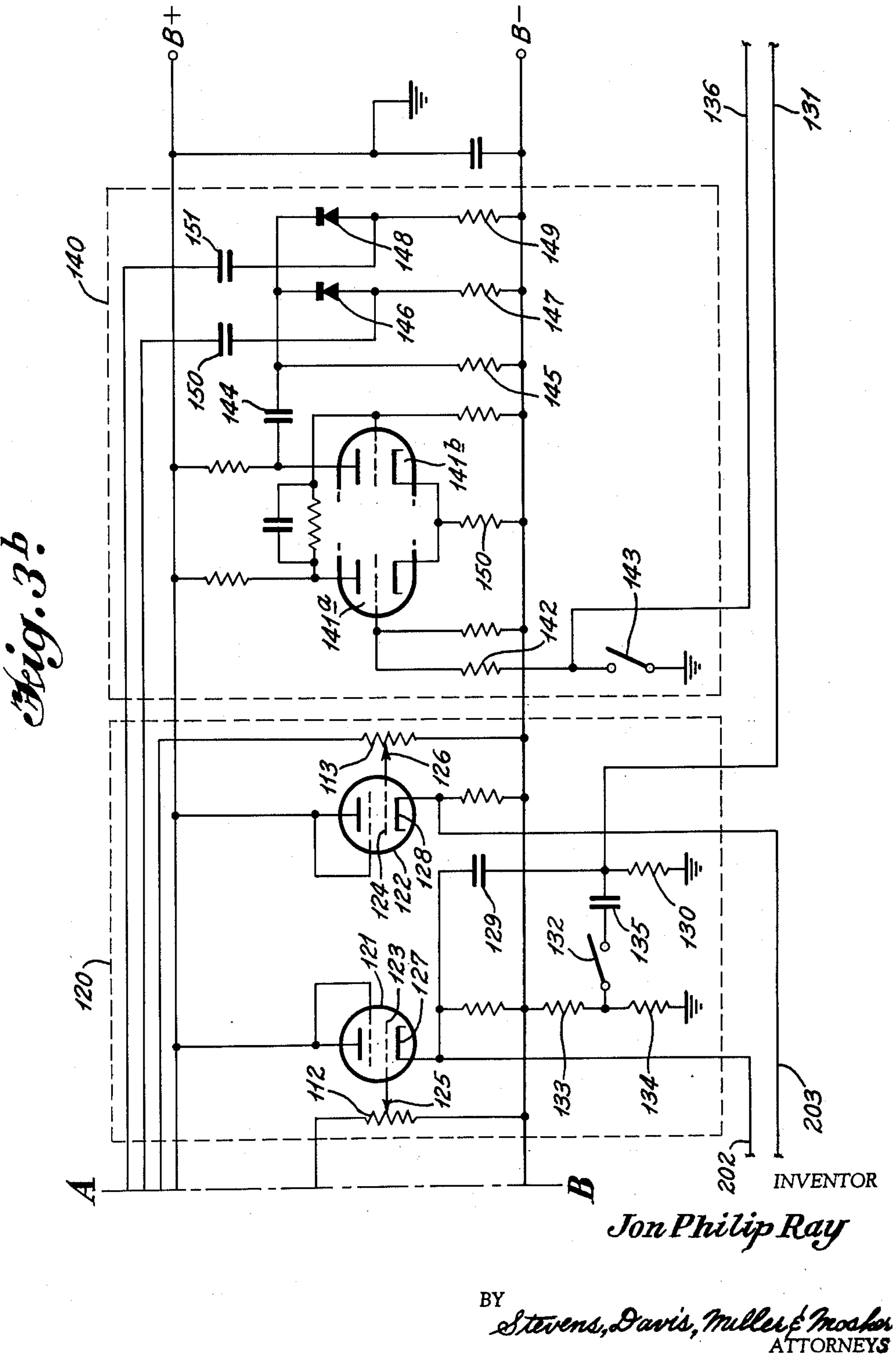
Figure 3C:
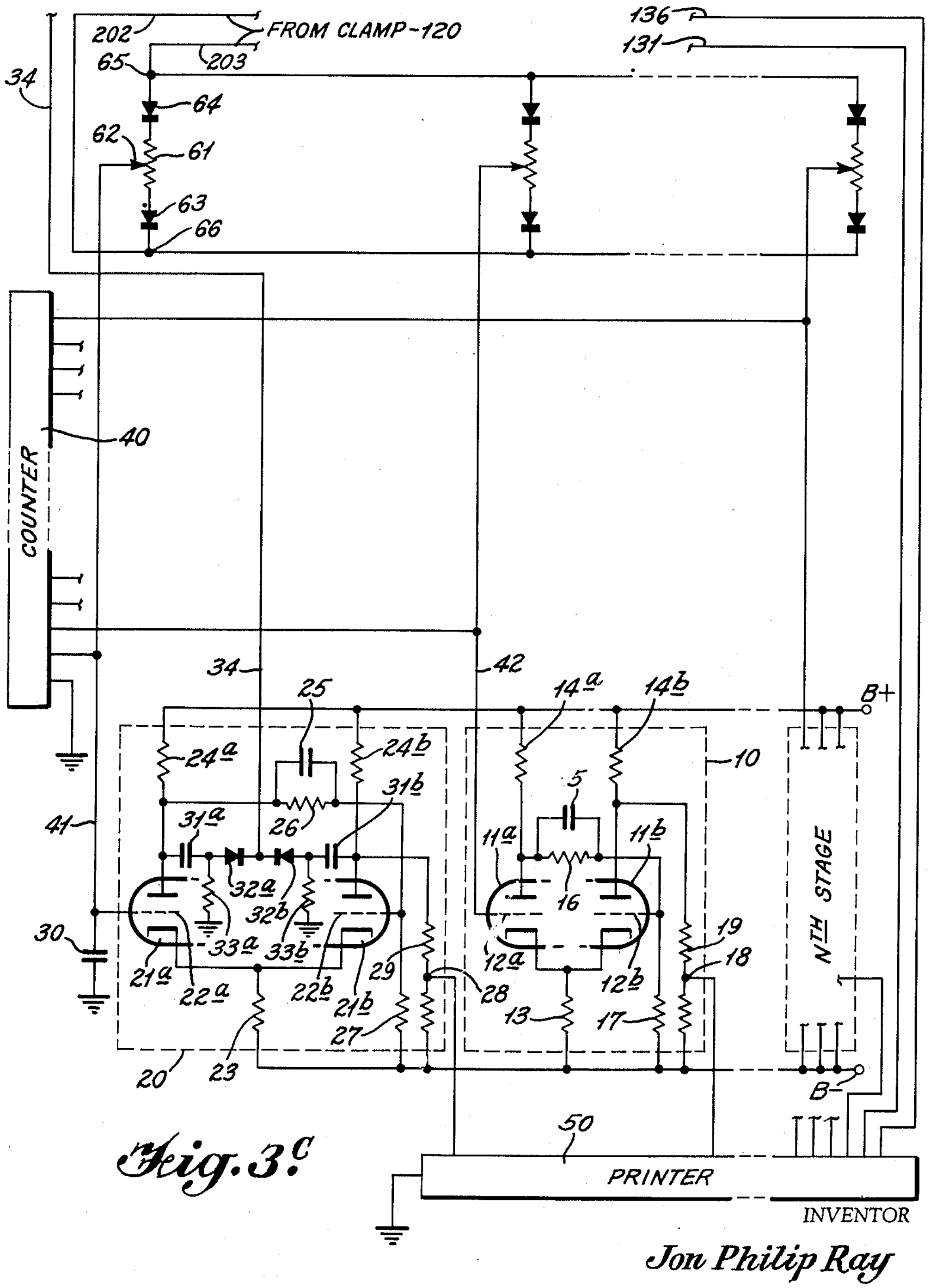

Reference is now made to FIGURE 3*c* of the overall schematic circuit diagram. As is shown in FIGURE 3*c*, the auxiliary storage register is composed of a plurality of storage stages, preferably of the Schmitt trigger type. The second through the *n*th stages are identical, and hence only the first two stages are shown in detail. A typical stage is the second from the left and is indicated generally by the numeral 10.

The stage 10 is constructed about a dual triode **11*a* and 11*b*. Input information is applied to the grid 12*a* of the tube 11*a*. The cathodes of the dual triode 11*a* and 11*b* are connected to a B− supply through a common resistor 13, while the plates are connected to a B+ supply by means of resistors 14*a* and 14*b* respectively. A parallel resistor 16 and capacitor 15 connects the plate of tube 11*a* to the grid 12*b* of tube 11*b*, and a resistor 17 is connected between the grid 12*b* and the B− supply. The output from the stage 10 is taken from a tap 18 on a resistor 19 connected between the plate of tube 11*b* and B−. The output voltage appearing at the tap 18 applies a signal indicative of the contents of the storage stage 10 to the printer shown in block form at 50**. The remaining stages 3 through *n* are identical to the second stage 10 and also have their outputs feeding the printer 50.

The first stage is designated generally by the numeral 20 and is also a Schmitt trigger. This stage is constructed about a dual triode **21*a* and 21*b*, having its common cathode conected to B− through a resistor 23 and its plates connected to the B+ bias through resistors 24*a* and 24*b* respectively. Parallel capacitor 25 and resistor 26 are connected between the plate of triode half 21*a* and the grid 22*b* of triode half 21*b* as before, the grid 22*b* being connected to B− by a resistor 27. As in the second stage, the input is applied to grid 22*a* of triode half 21*a*, and the output from the stage 20 is taken from tap 28 on a resistor 29 connected between the plate of triode half 21*b* and B−. The voltage at the tap 28 applies the output signal from the stage 20 to the printer 50**.

The stage 20 differs from the stage 10 in that a capacitor 30 is connected between the grid **22*a* and ground and that the plates of both triode halves 21*a* and 21*b* are connected together by means of a series circuit consisting of capacitors 31*a* and 31*b*, along with oppositely connected diodes 32*a* and 32*b*. A pair of resistors 33*a* and 33*b* shunt the anodes of the diodes to ground. A lead 34 is connected to the point where the cathodes of the diodes 32*a* and 32*b* are connected together and the lead 34 carries output signals from the first storage stage 20 to the AND gate 100** shown in FIGURE 2, and in more detail in FIGURE 3*a*.

The reason for the additional circuitry in the stage 20 will now be explained. Since it may be desired to initiate a print command at any time with respect to the times when the contents of the stages of the auxiliary storage register are changing, a problem arises if a signal to initiate the printing occurs just as one or more of the storage triggers is about to change its state. A provision must be made so that the storage stages are clamped in a safe period, i.e., at a time when the states of the storage stages are not changing. To ensure that this occurs, a slight delay (capacitor 30) is provided at the input to the stage 20 so that all the storage triggers will have changed their states before being clamped. The delay is placed at the input to the first storage stage because this stage carries the least significant digit. Hence there will be a change in the contents of the first stage every time there is a change in the contents of any of the remaining stages. Therefore, if the input to the first stage is delayed sufficiently, by noting when the first stage has completed its change (this is done by means of the signal on the lead 34), every stage of the storage register will be at rest when the storage register is clamped.

The inputs to the storage stages are applied from outputs on the respective counter stages. Thus, as is shown in FIGURE 3*c*, the grid **22*a* of tube 21*a* of the first storage stage 20 is fed by a lead 41 from the first stage of the counter 40, the grid 12*a* of the second stage 10 is fed by a lead 42 connected to the second stage of the counter 40**, similarly for the remaining stages.

The circuitry for clamping the storage stages consists of a series of potentiometers, each connected to the grid of a storage stage to apply an essentially constant bias thereto upon a command to clamp the storage stages. The potentiometer circuit for each stage is identical, and for illustrative purposes the potentiometer circuit connected to the grid of the first stage 20 will be discussed. The lead 41, which is connected to the grid of tube **21*a* of the first storage stage 20 is also connected to a tap 62 on a potentiometer 61. The potentiometer 61 is connected in series with diodes 63 and 64 poled as is shown in FIGURE 3 to allow a current flow in the downward direction only between points 65 and 66. When there is a low potential at point 65 and a higher potential at point 66, no current will flow through the potentiometers because the diodes 64 and 63 will be back biased. Therefore, the grid 22*a*** will be isolated and will follow input information received from the counter.

However, if the potential at point 65 is made to exceed that at point 66, current will flow through diodes 64 and 63 and potentiometer 61. The input driving source impedance to the tube **21*a* is of the order of ten times greater than that of half of the potentiometer resistance; hence substantially all of the applied voltage is across the input impedance to the tube 21*a*, i.e. is applied to the grid 22*a* so long as the diodes 63, 64 are back-biased. When the diodes are conducting, however, the potential on the grid 22*a* is prevented from any considerable amount of fluctuation, i.e. the grid voltage is clamped at a voltage dependent upon the setting of the movable tap 62 on the potentiometer 61. When this occurs, the changes in the output of the counter will no longer be able to trigger the tube 21*a* to change its state. The remaining potentiometer networks, which are connected to the respective input grids of the left hand tubes in the remaining stages of the auxiliary storage register, operate in the same manner as was described above with reference to the first stage 10**.

The auxiliary storage register stages 10, 20, etc. are Schmitt trigger or cathode-coupled bistable multivibrator circuits of the type described in the textbook "Waveforms," Chance et al., 1949, McGraw-Hill Radiation Laboratory Series, pp. 165–167. This type of circuit exhibits a "hysteresis" effect, meaning that the input voltage level required to switch from one state to the other is greater than the level at which the circuit switches back to the original state. By connecting the cathodes of the tubes 11*a*, 11*b* to a negative supply rather than to ground, the hysteresis can be made to straddle zero, or to switch from "0" to "1" at +5 v. and from "1" to "0" at −5 v. Any voltage in the range −5 to +5 v. will be ineffective to change the state of the register stages.

The operation of the auxiliary register and clamper may best be understood by considering example values for input voltages and impedances. If the counter 40 produces an output on the line 42 of +10 v. to indicate a "1" and −10 v. to indicate a "0," then it is seen that the tube **11*a* will be conducting in the "1" condition and the tube 11*b* will conduct for a "0." When the tube 11*a* is conducting, its plate voltage will be low and the tube 11*b* will be maintained in a cut-off condition by the coupling including the resistors 16 and 17. The clamping operation may be explained by assuming that the internal impedance of the counter is very high, on the order of megohms, and the resistors 61 in the clamper have relatively low values, about 200K ohms. When the diodes 63, 64 are back-biased, the counter output will appear undiminished on the grid 12*a* and the appropriate grids of the other stages due to the high input impedance of the tubes. When the diodes 63, 64 are conducting, however, the inputs of the auxiliary register stages are shunted by the low impedance between the taps 62 and ground. That is to say, the high source impedance of the counter, compared to the low impedance of the potentiometers 61**, results in the counter output voltage appearing across the internal impedance of the counter rather than at the auxiliary register inputs.

Figure 2:
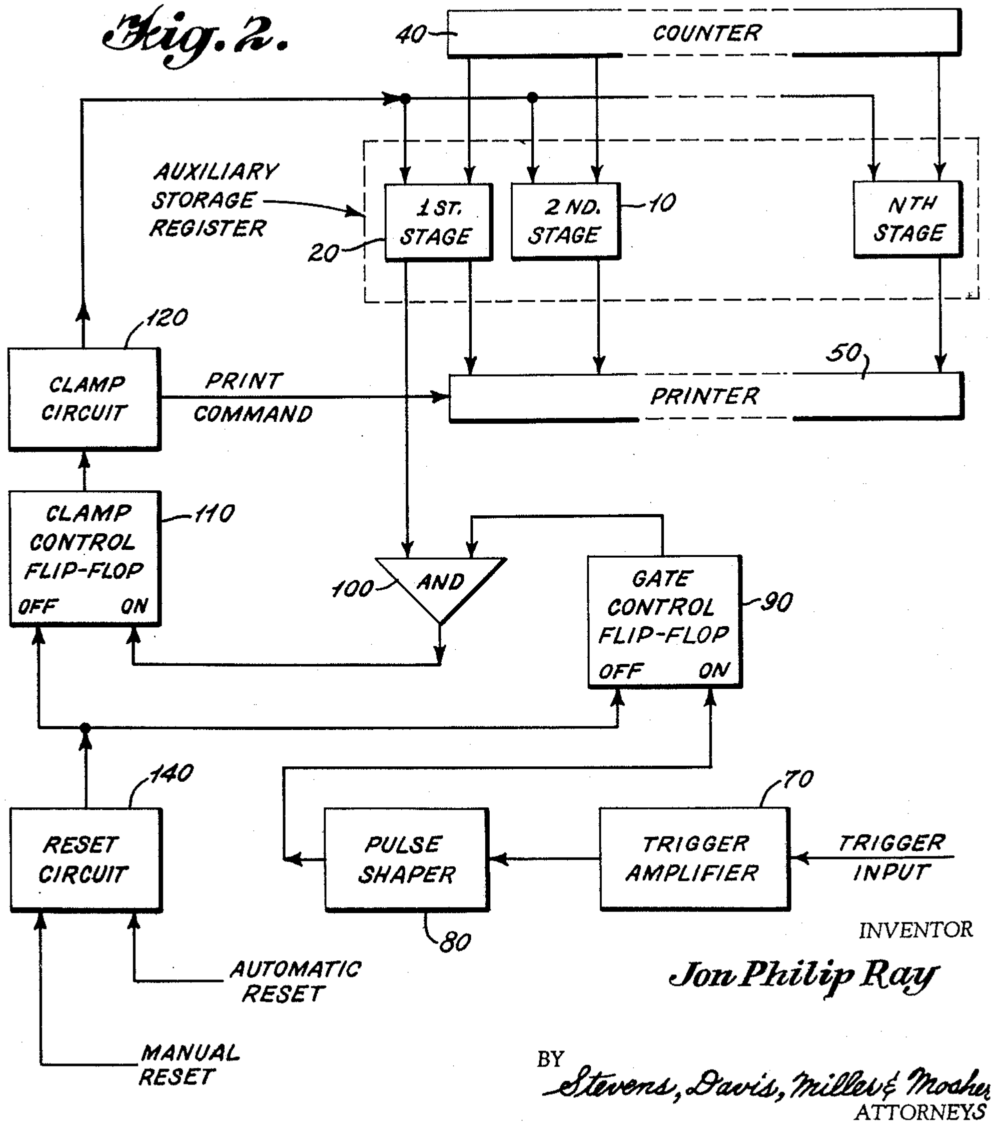
FIGURE 2 is a more detailed block diagram of the apparatus of the invention.

FIGURES 3*a* and 3*b* show in detail the circuitry designated by the block labeled Control in FIGURE 1 and illustrated more specifically as the trigger amplifier 70, pulse shaper 80, gate control flip-flop 90, AND gate 100, clamp control flip-flop 110, clamp circuit 120 and reset circuit 140 in FIGURE 2.

The trigger amplifier 70 employs a dual triode **71*a* and 71*b*, the first tube half 71*a* acting as either an inverter or a cathode follower, depending upon input pulse polarity, and the second half 71*b* serving as a pulse amplifier. The plate of tube 71*a* is connected to the grid of tube 71*b* by means of a diode 72 and a capacitor 200, while a diode 73 and capacitor 201 are connected between the cathode of tube 71*a* and the grid of tube 71*b*. The input to the trigger amplifier 70 is applied to terminal 74 which is connected to a circuit consisting of capacitor 75 and potentiometer 76. A movable tap 77 on the potentiometer 76 is connected to the grid of tube 71*a***.

If the trigger input applied to terminal 74 is a positive pulse, tube **71*a* will be made to conduct, which will lower the potential at the plate of the tube and raise the potential at the cathode due to the current flowing in plate resistor 78 and cathode resistor 79 respectively. The diode 73 will pass the positive pulse at the cathode of tube 71*a*, while the diode 72 will not permit the passage of the negative spike at the plate of tube 71*a*. Thus a positive pulse will be applied to the grid of tube 71*b* of the trigger amplifier 70. On the other hand, if a negative pulse is applied to input terminal 74, tube 71*a* will be cut off. This will raise the plate potential of tube 71*a* and lower the cathode potential, creating a positive pulse at the plate and a negative pulse at the cathode. The positive pulse at the plate will pass through the diode 72 to the grid of tube 71*b*, while the diode 73 will block the passage of the negative pulse at the cathode. Therefore, regardless of whether the trigger input is positive or negative, a positive pulse will be applied to the grid of tube 71*b*. The application of a positive pulse to the grid of tube 71*b*** increases the current flow through the tube and thus creates a negative pulse at the plate.

The negative pulse at the plate of tube **71*b* is applied to a pulse shaper, which is designated generally by the numeral 80. The pulse shaping circuit 80 employs a dual triode 81*a* and 81*b* connected in the Schmitt trigger manner as was described above with reference to the stages 10 and 20 of the auxiliary storage register. Series resistors 82 and 83 act as a voltage divider to normally bias the grid of tube 81*a*, so that the tube 81*a* is conducting. The negative output pulses from the trigger amplifier 70 are applied to the grid of tube 81*a* through a coupling capacitor 84, and when a negative pulse is present at the grid of tube 81*a*, the tube 81*a* is cut off. This causes tube 81*b* to conduct, generating a negative step at the plate of tube 81*b***.

A differentiating network consisting of capacitor 85 and resistor 86 is connected between the plate of tube **81*b* and B− to differentiate the negative step which appears at the plate of tube 81*b* and to thus produce a sharper pulse for application to the gate control flip-flop. A diode 87** is connected to the output of the differentiating network so that only negative pulses will be passed.

The gate control flip-flop, which is designated generally by the numeral 90, employs a dual triode **91*a* and 91*b* connected in the form of a bistable multivibrator. The Off state of the flip-flop 90 is defined to exist when the tube 91*a* is conducting and the tube 91*b* is cut off. The output of the pulse-shaper 80 is connected to the grid of tube 91*a* of the gate control flip-flop 90 by means of coupling capacitor 88, and when a negative output pulse from the pulse shaper 80 occurs, the tube 91*a* becomes cut off and the tube 91*b* starts to conduct. This places the flip-flop 90 in the On state, and since current no longer flows through plate resistor 92 of tube 91*a*, the potential at the plate of tube 91*a* is increased. The plate of tube 91*a* is connected to one input of the AND gate 100**.

The AND gate 100 is constructed about a pentode 101 having control grids 102 and 103. The control grid 102 is connected to the point between series resistors 93 and 94 which are connected between the plate of tube **91*a* of the gate control flip-flop 90 and B−. A high potential is applied to grid 102 when the flip-flop 90 in the On state, due to the high potential of the plate of tube 91*a*. The grid 103 is connected, by means of a coupling capacitor 95, to the lead 34 which carries output pulses from the first stage 20 of the auxiliary storage register whenever the state of this stage changes, thus indicating that all of the stages of the auxiliary storage register have completed any change in their states and are at rest so that they may be safely clamped. The AND gate 100 is defined to be open when the tube 101 is conducting, and this will occur only when both control grids 102 and 103 are positive. Hence, the plate of tube 101 will be at a low potential only when the gate control flip-flop is On and when an output pulse is received from the first stage 20 of the auxiliary storage register via the lead 34**.

The clamp control flip-flop is designated generally by the numeral 110 and is connected in the form of a bistable multivibrator constructed about a dual triode **111*a* and 111*b*. The circuit is identical to that of the clamp control flip-flop 90. The Off state is defined to exist when tube 111*a* is conducting, the On state occurring when the 111*b* is conducting. The clamp control flip-flop 110 is normally in the Off state, but when a negative output pulse from the AND gate 100, which indicates that the gate is open, is applied to the grid of tube 111*a* through a coupling capacitor 104 connected between the plate of tube 101 and the grid of tube 111*a*, the tube 111*a* is cut off. This turns the flip-flop 110 On, and causes the potential at the plate of tube 111*a* to increase, with the plate potential of tube 111*b* decreasing. The plates of tubes 111*a* and 111*b* are connected to potentiometers 113 and 112** respectively.

The potentiometers 113 and 112 serve as input circuits for a clamp circuit designated generally by the numeral 120 and constructed around a pair of high current tetrodes 121 and 122. The control grid 123 of tetrode 121 is connected to a movable tap 125 on the potentiometer 112, while the control grid 124 of tetrode 122 is similarly connected to a movable tap 126 on the potentiometer 113. The cathode of the tetrode 121 is connected to the bottom points 66 of the parallel connected potentiometers 61 which feed the input grids of the auxiliary storage register stages via conductor 202 while the cathode 128 of the tetrode 122 is connected to the upper points 65 of the parallel connected potentiometers 61 via conductor 203.

When the flip-flop 110 is in the Off state, tube 111a is conducting, hence its plate is at a relatively low potential, and therefore a relatively low potential is applied to the grid 124 of tetrode 122 so that the tetrode 122 is cut off. At the same time tube 111b is cut off, and its plate is at a relatively high potential so that a high potential is applied to grid 123 of tube 121. Hence, the cathode 127 of tetrode 121 is at a higher potential than the cathode 128 of tetrode 122, and the diodes 63 and 64 are back biased so that no current flows through the potentiometer 61.

When the clamp control flip-flop 110 is placed in the On state, the tube 111a is cut off, and a high potential is applied to the grid 124 of tetrode 122 to cause the tube 122 to conduct. The tube 111b is now conducting and hence a low potential is applied to the grid 123 of tetrode 121 which cuts off the tube 121. The cathode 128 of tetrode 122 now assumes a higher potential than the cathode 127 of tetrode 121, and the diodes 64 and 63 become biased in the forward direction causing current to flow through the potentiometer 61, thus clamping the input grids of the stages of the auxiliary storage register in the manner described above.

The cathode 127 of tetrode 121 is grounded through capacitor 129 and resistor 130 which form a differentiating network. As the tube 121 is cut off in response to the flip-flop 110 being turned On, the potential at the cathode 127 decreases, and the differentiating network serves to apply a negative pulse across resistor 130. This negative pulse is applied via a lead 131 to the printer 50 to command the commencement of the actual printing operation.

The actual printing operation can also be commenced by manually closing a switch 132. When the switch 132 is closed, the voltage across the resistor 134, caused by current flow through series resistors 133 and 134, is applied to differentiating capacitor 135 and resistor 130, and a negative print command pulse is sent to the printer on the line 131.

When the printer receives a print command, a relay is closed which grounds one of the prongs on the printer, and this point remains grounded until the printing operation is finished. The grounded printer prong is connected via line 136 to the input of a reset circuit 140. The reset circuit 140 is constructed about a pair of dual triodes 141a and 141b connected as a Schmitt trigger similar to the pulse shaper circuit 80. The grid of tube 141a is connected to the line 136 through a resistor 142, the resistor 142 being also connected to a manual reset switch 143.

A differentiating network consisting of a capacitor 144 and a resistor 145 is connected to the plate of tube 141b, and a pair of parallel circuits consisting of a diode 146 and resistor 147 and a diode 148 and resistor 149 are both connected across the resistor 145. The anode of the diode 146 is connected through a capacitor 150 to the grid of tube 91b, which is the Off input to the gate control flip-flop 90. Similarly, the anode of diode 148 is connected through a capacitor 151 to the grid of tube 111b, which is the Off input to the clamp control flip-flop 110.

The reset circuit 140 normally operates with tube 141a cut off and tube 141b conducting. However, when the printer starts to print, the lower end of the resistor 142 is grounded, thus making the grid of tube 141a more positive than the grid of tube 141b. This causes tube 141a to conduct and tube 141b to become cut off. The potential at the plate of tube 141b is thus increased, and a positive step is applied across the differentiating capacitor 144 and resistor 145. This differentiating network causes a positive pulse to appear across the resistor 145, but because of the polarity of the diodes, the positive pulse is not passed. However, when the printer finishes the printing operation, the bottom of the resistor 142 is released from ground potential, and the tube 141b starts to conduct while cutting off the tube 141a. The plate potential of tube 141b thus decreases, and a negative pulse appears across resistor 145. This pulse is passed by the diodes 146 and 148 so as to apply the negative pulse to the reset, or Off, inputs of the gate control flip-flop 90 and the clamp control flip-flop 110 respectively. As the clamp control flip-flop 110 is reset, the tube 111b is cut off. This causes tube 121 of the clamp circuit 120 to conduct, thus making point 66 at the lower end of the potentiometer 61 more positive than the point 65 at the upper end. Current will no longer flow through diodes 63 and 64 and the potentiometer 61; hence the clamp on the input grids of the stages of the auxiliary storage register is released.

Power for the operation of the vacuum tubes in both the auxiliary storage register and its control circuitry is supplied from a regulated power supply, which is capable of supplying 400 milliamps. and which provides the necessary B− and B+ voltages, along with the filament voltages for the vacuum tubes.

When the circuitry of the present invention is first turned on, the flip-flops 90 and 110 may come to rest in either one of their two stable states. Hence, to insure that both flip-flops will be Off, the manual reset switch 143 is first closed in order to ground the lower end of the resistor 142 and cut off tube 141b, and then opened so as to cut off tube 141a and cause the tube 141b to conduct. This generates the negative pulse across the resistor 145 which is applied to the reset grids of the flips-flops 90 and 110 to initially place both flip-flops in the Off state.

Although the present invention has been shown and described with reference to particular embodiments, nevertheless various changes and modifications obvious to those skilled in the art are deemed to be within the spirit, scope and contemplation of the invention.

What is claimed is:

1. In combination with a digital counter, apparatus for recording an indication of the condition of the counter upon command without interfering with the normal operation of the counter, said apparatus comprising storage means, said storage means including a plurality of trigger circuits, tracking means connecting the counter and each of said trigger circuits so that said trigger circuits continuously track the counter and assume a condition correlated with the condition of the counter, recording means connected to said trigger circuits adapted to make a record indicative of the condition of said trigger circuits and clamping means responsive to a predetermined command to render said tracking means inoperative to actuate said storage means and concomitantly maintain the condition of said trigger circuits in a condition indicative of the count in said counter at the time of said command to obtain thereby a recorded indication of the condition of said storage means.

2. The combination according to claim 1 wherein said control means includes a reset means to return said storage means to continuously track the counter.

3. A device as set forth in claim 1 wherein said triggers are Schmitt triggers.

4. In combination wtih a digital counter, apparatus for recording an indication of the condition of the counter upon command without interfering with the normal operations of the counter, said apparatus comprising storage means, said storage means including a plurality of trigger circuits, tracking means connecting the counter and each of said trigger circuits so that said trigger circuits continuously track the counter and assume a condition correlated with the condition of the counter, recording means connected to said trigger circuits adapted to make a record indicative of the condition of said trigger circuits and clamping means responsive to a predetermined command condition to concomitantly disconnect each of said trigger circuits from said counter and control means operative in response to said predetermined command condition to actuate said clamping means and said recording means to obtain thereby a recorded indication of the condition of said storage means.

5. A device as set forth in claim 4 wherein said trigger circuits are Schmitt triggers.

6. In combination with a digital counter, apparatus for recording an indication of the condition of the counter upon command without interfering with the normal operations of the counter, said apparatus comprising storage means, said storage means comprising a register of vacuum tube storage stages, each said vacuum tube having a grid, the grids of said vacuum tube storage stages being connected to respective outputs on the counter, tracking means connecting the counter and said storage means so that said storage means continuously tracks the counter and assumes a condition correlated with the condition of the counter, recording means connected to said storage means adapted to make a record indicative of the condition of said storage means, clamping means to render said tracking means inoperative and maintain the condition of said storage means and control means operative in response to a record command signal to actuate said clamping means and said recording means, said control means including means for preventing the said outputs on the counter from controlling the grids of said vacuum tube storage stages as long as the recording operation is in progress whereby there is obtained a recorded indication of the condition of said storage means at the time of said record command signal.

References Cited in the file of this patent

UNITED STATES PATENTS

| | | |
|---|---|---|
| 2,791,746 | Bowersox et al. | May 7, 1957 |
| 2,841,334 | Abate | July 1, 1958 |
| 2,866,177 | Steele | Dec. 23, 1958 |
| 2,922,576 | Winfield | Jan. 26, 1960 |
| 2,954,266 | Danielson et al. | Sept. 27, 1960 |

OTHER REFERENCES

"Digital Printer Boosts Readout Time" by H. W. Gettings, from "Electronics," June 1957.